United States Patent [19]

Bland et al.

[11] Patent Number: 5,561,820
[45] Date of Patent: Oct. 1, 1996

[54] BRIDGE FOR INTERFACING BUSES IN COMPUTER SYSTEM WITH A DIRECT MEMORY ACCESS CONTROLLER HAVING DYNAMICALLY CONFIGURABLE DIRECT MEMORY ACCESS CHANNELS

[75] Inventors: Patrick M. Bland, Austin, Tex.; Daniel R. Cronin, III, Lake Worth, Fla.; Richard G. Hofmann, Cary, N.C.; Dennis Moeller; Lance M. Venarchick, both of Boca Raton, Fla.

[73] Assignee: International Business Machines Corporation, Armonk, N.Y.

[21] Appl. No.: 351,220

[22] Filed: Nov. 30, 1994

[51] Int. Cl.⁶ .................................................. G06F 13/28
[52] U.S. Cl. ........................... 395/847; 395/846; 395/842; 395/200.13
[58] Field of Search ...................................... 395/821, 842, 395/825, 846, 847, 200.13

[56] References Cited

U.S. PATENT DOCUMENTS

| | | | |
|---|---|---|---|
| 4,831,514 | 5/1989 | Turlakov et al. ............... | 364/200 |
| 5,274,780 | 12/1993 | Nakao ................................. | 395/325 |
| 5,280,915 | 5/1993 | Stadlmeier et al. .............. | 395/325 |
| 5,379,384 | 1/1995 | Solomon ............................ | 395/325 |
| 5,386,518 | 1/1995 | Reagle et al. .................... | 365/325 |
| 5,450,551 | 9/1995 | Amini et al. ..................... | 395/299 |
| 5,465,332 | 11/1995 | Deloye et al. ................... | 395/842 |

*Primary Examiner*—Christopher B. Shin

[57] ABSTRACT

A bridge interface for buses in a computer system has a direct memory access (DMA) controller that controls memory transfers in the computer system. The DMA controller has a pair of cascaded DMA controller chips that provide a plurality of DMA channels. A multiplexer circuit receives memory address signals from the DMA controller chips. The memory address signals are received in both a shifted form and an unshifted form at the multiplexer inputs. By selection of the shifted or the unshifted memory address at the multiplexer, either even or odd addresses are produced at the multiplexer output for each DMA channel, thereby selectively providing 8-bit or 16-bit memory accesses. The control of the multiplexer is programmable for each DMA channel, providing dynamic configuration of the DHA channels as either 8-bit or 16-bit channels.

10 Claims, 7 Drawing Sheets

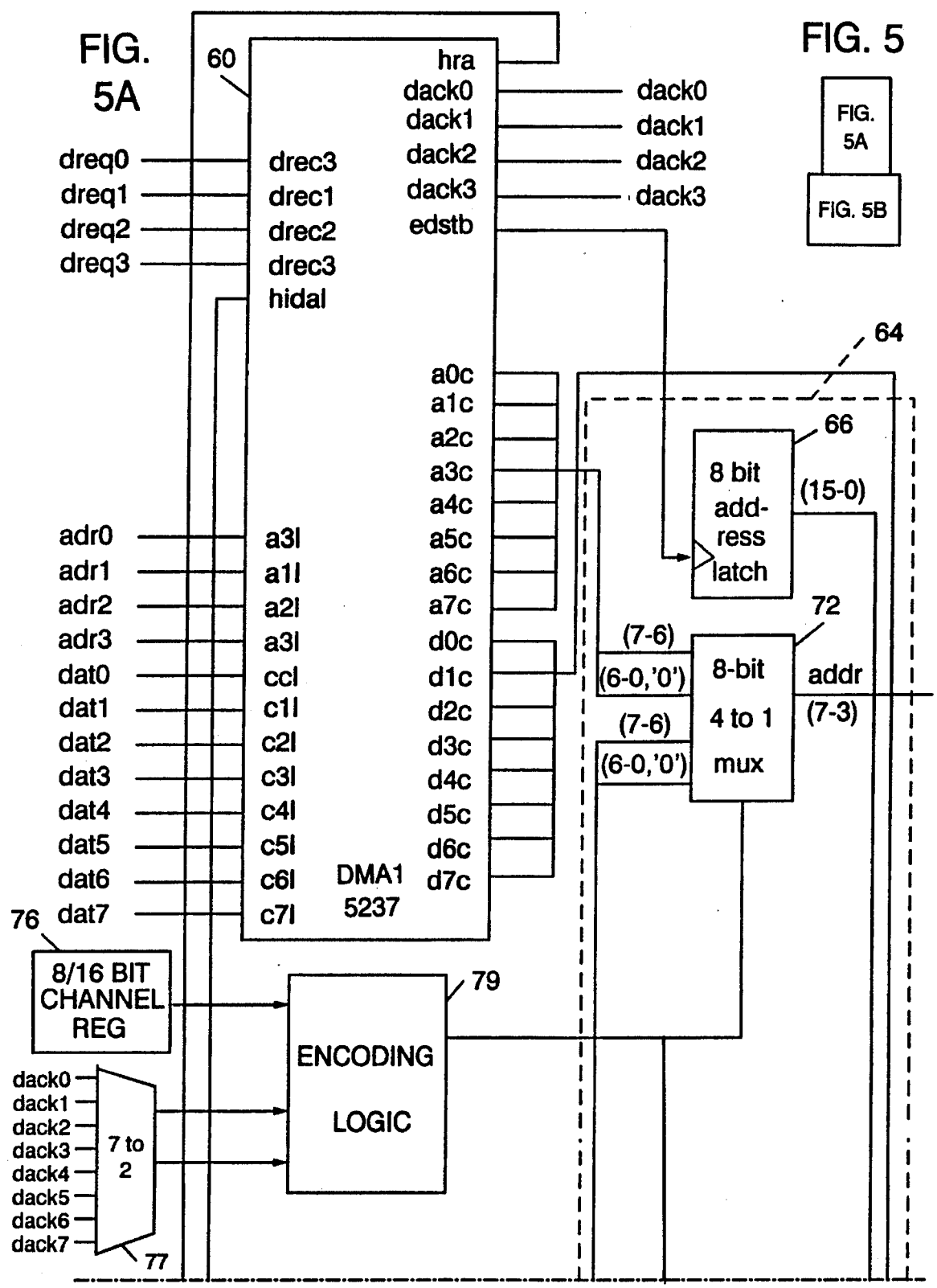

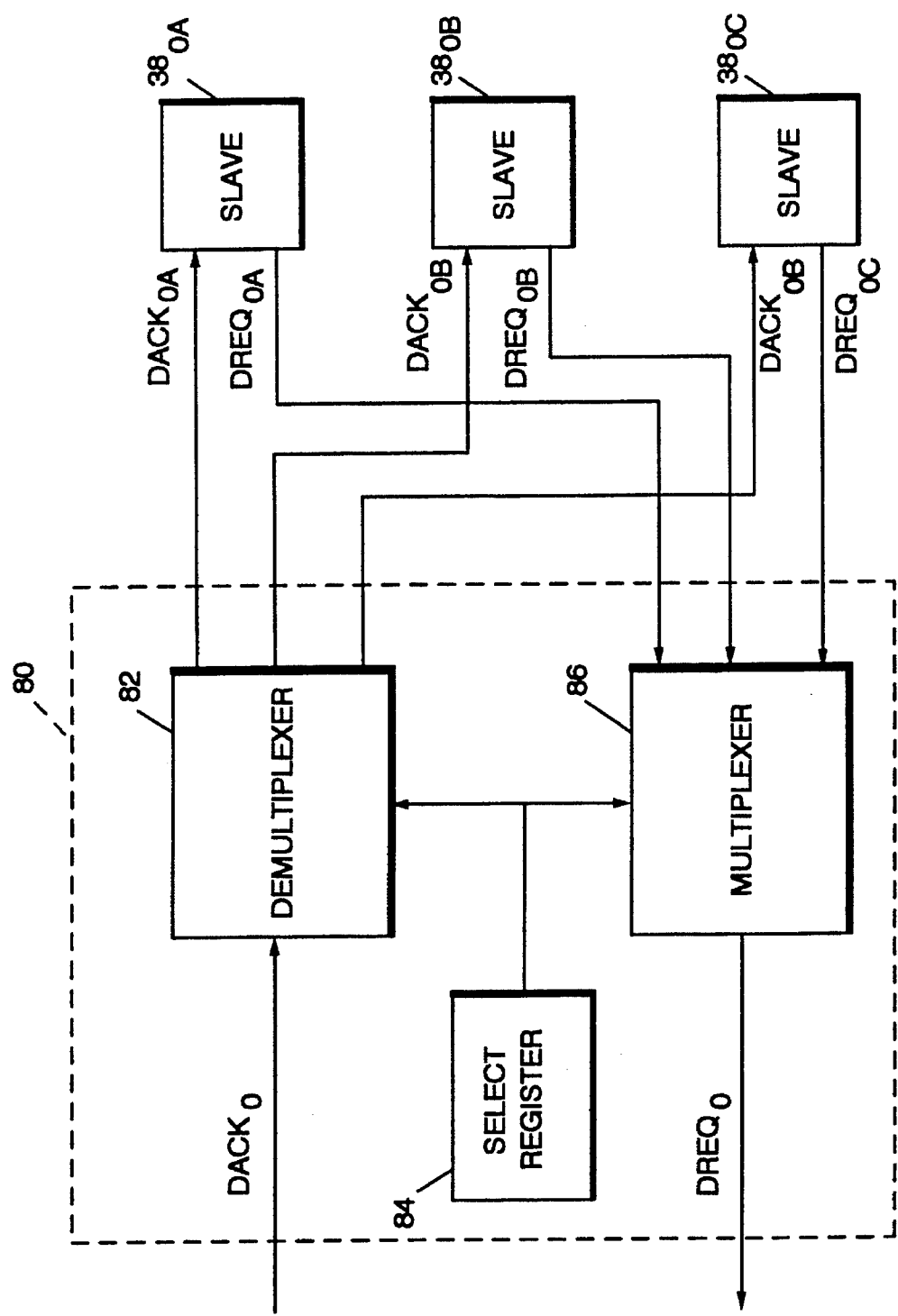

BRIDGE FOR INTERFACING BUSES IN COMPUTER SYSTEM WITH A DIRECT MEMORY ACCESS CONTROLLER HAVING DYNAMICALLY CONFIGURABLE DIRECT MEMORY ACCESS CHANNELS

BACKGROUND OF THE INVENTION

1. Technical Field of the Invention

The present invention relates to the field of memory transfers in digital computers, and more particularly, to a direct memory access controller that provides a plurality of direct memory access channels over which memory data can be transferred.

2. Description of Related Art

In a digital computer, a microprocessor operates on data stored in a main memory. Since there are practical size limitations on the main memory, bulk memory storage devices are provided in addition to and separately from the main memory. When the microprocessor wants to make use of data stored in bulk storage, for example, a hard disk, the data is moved from the hard disk into the main memory. This movement of blocks of memory inside the computer is a very time consuming process and would severely hamper the performance of the computer system if the microprocessor were to control the memory transfers itself.

In order to relieve the microprocessor from the chore of controlling the movement of blocks of memory inside the computer, a direct memory access (DMA) controller is used. The DMA controller receives information from the microprocessor as to the base location from where bytes are to be moved, the address to where these bytes should go, and the number of bytes to move. Once it has been programmed by the microprocessor, the DMA controller oversees the transfer of the memory data within the computer system. Normally, DMA operations are used to move data between input/output (I/O) devices and memory.

A commercially available DMA controller is the 8237 DMA controller manufactured by Intel. Each 8237 DMA controller provides four separate DMA channels which can be used independently for memory transfers. Certain well-known computer systems, such as the IBM PC/AT design, contain two 8237 DMA controllers. One channel of the DMA controllers is used to cascade the second DMA controller. The pair of DMA controllers therefore provide a total of seven DMA channels, with four channels provided by the first controller, and three channels provided by the second controller.

Each of the seven DMA channels has the capability of providing 16-bit accesses to memory. The channels are also configurable to provide 8-bit accesses to memory. Whether a channel forms 16-bit accesses or 8-bit accesses is dependent upon on which controller a channel is located. In this prior art system the hard-wiring of the controller chip to the address lines of the address bus determines whether the channels of that particular DMA controller chip would form 16-bit accesses or 8-bit accesses to memory. Once the DMA controller chips are connected to the address bus, all of the DMA channels of a controller chip are set to provide the same size access to memory as the other DMA channels on that chip. In the PC/AT design, the four channels 0–3 contained on the first DMA controller chip are defined as 8-bit channels, while the three DMA channels 5–7 on the second DMA controller chip are defined as 16-bit channels. Channel 4, located on the second DMA controller chip, is the cascade channel which allows channels 0–3 of the first DMA controller to arbitrate through the priority network of the second DMA controller.

In order to provide the differently sized memory accesses, the address connections of the first DMA controller to the address bus in the PC/AT are different than the address connection of the second DMA controller to the address bus. This connection allows the first DMA controller channels to perform even or odd accesses and therefore 8-bit accesses to memory. The second DMA controller is connected to the same address bus as the first DMA controller, but in a shifted manner which causes the second DMA controller to perform only even address or 16-bit accesses to memory. The second DMA controller therefore will only be able to perform word transfers, while the first DMA controller performs byte transfers.

The hard-wired configuration of the interface between the cascaded DMA controllers and the address bus limits the PC/AT computer system to four 8-bit DMA channels and three 16-bit DMA channels. This constrains the system designer in the number of 8-bit and 16-bit slaves that can be coupled to the system.

SUMMARY OF THE INVENTION

There is a need for a system and a DMA control circuit which uses a conventional cascaded DMA controller but provides DMA channels that can be dynamically configured as either 8-bit or 16-bit channels.

This and other needs are met by the present invention which provides a bridge for interfacing buses in a computer system that has a plurality of buses, a processor arid a memory, the bridge comprising a direct memory access (DMA) control circuit coupled to the processor and the memory. The DMA control circuit includes a pair of cascaded DMA controllers that provide a plurality of DMA channels, wherein each of the DMA channels is dynamically configurable to carry either first size accesses to memory or second size accesses to memory. A plurality of DMA slaves of the computer system respectively communicate with the DMA control circuit over the individual DMA channels, each DMA slave being either a first size compatible slave or a second size compatible slave.

The present invention provides the advantages of dynamic configuration of the DMA channels that are provided by a pair of cascaded DMA controllers. This allows DMA slaves to be used that can be either of a first or second size. A system designer therefore has complete freedom to configure each DMA channel to provide either first size accesses to memory, or second size accesses to memory, on an individual basis.

In certain embodiments of the present invention, the DMA control circuit includes a multiplexer circuit coupled to the cascaded DMA controllers. This multiplexer circuit receives an unshifted memory address and a shifted memory address from the cascaded DMA controllers. The multiplexer circuit also receives a select signal that causes the multiplexer circuit to selectively produce either the unshifted memory address or the shifted memory address. The unshifted memory address corresponds to the first size access to memory and the shifted memory address corresponds to the second size access to memory.

Since both a shifted memory address and an unshifted memory address are provided to the multiplexer circuit, a dynamic selection of the output signal of the multiplexer will produce either the shifted memory address or the unshifted memory address, corresponding to the first or second size accesses to the memory. This is in contrast to the hard-wired configuration of the DMA controllers of the prior art in which one DMA controller provided only shifted addresses, while the other DMA controller provided only unshifted addresses, thereby limiting the types of accesses by the individual DMA controllers.

In another aspect of the invention, a direct memory access control circuit is provided that comprises a pair of cascaded DMA controllers and a multiplexer circuit. The cascaded DMA controllers provide a plurality of DMA channels, wherein each of the DMA channels is dynamically configurable to carry either first size accesses to memory or second size accesses to a memory. The multiplexer circuit is coupled to the cascaded DMA controllers. This multiplexer circuit receives an unshifted memory address and a shifted memory address from the cascaded DMA controllers. A select signal causes the :multiplexer circuit to selectively produce either the unshifted memory address or the shifted memory address. The unshifted memory address is the first size access to a memory, and the shifted memory address is the second size access to a memory.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a block diagram of an embodiment of a demultiplexer and multiplexer unit from the embodiment of FIG. 6.

DESCRIPTION OF THE ILLUSTRATIVE EMBODIMENTS

Figure 1:
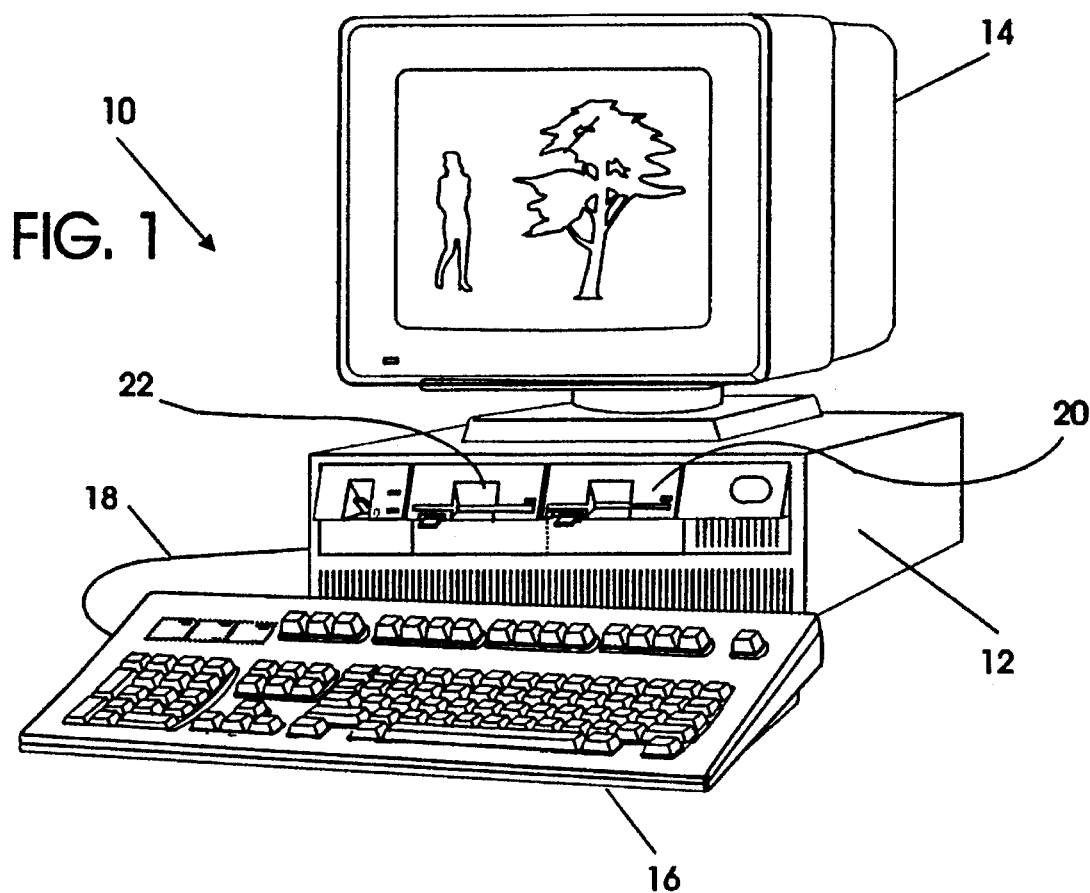
FIG. 1 is a perspective view of the basic elements of a computer system.

With reference now to the Figures and in particular with reference to FIG. 1, a conventional computer, or PC, designated 10, is of the environment to which the invention has particular utility. Computer 10 which preferably, but not necessarily, is of a type utilizing an IBM personal computer or a similar system, includes a console housing 12 in which a circuit board containing the necessary circuitry including a microprocessor and BIOS chips, controllers, random access memory and other hardware are arranged. The computer will also include a video display 14 and a keyboard 16 connected to the housing 12 through cable 18. Mass storage media includes a hard disk drive within the housing and is non-accessible to the user, and user-accessible floppy disks, as well as, optionally, CD-ROM drives 20 and 22.

Figure 2:
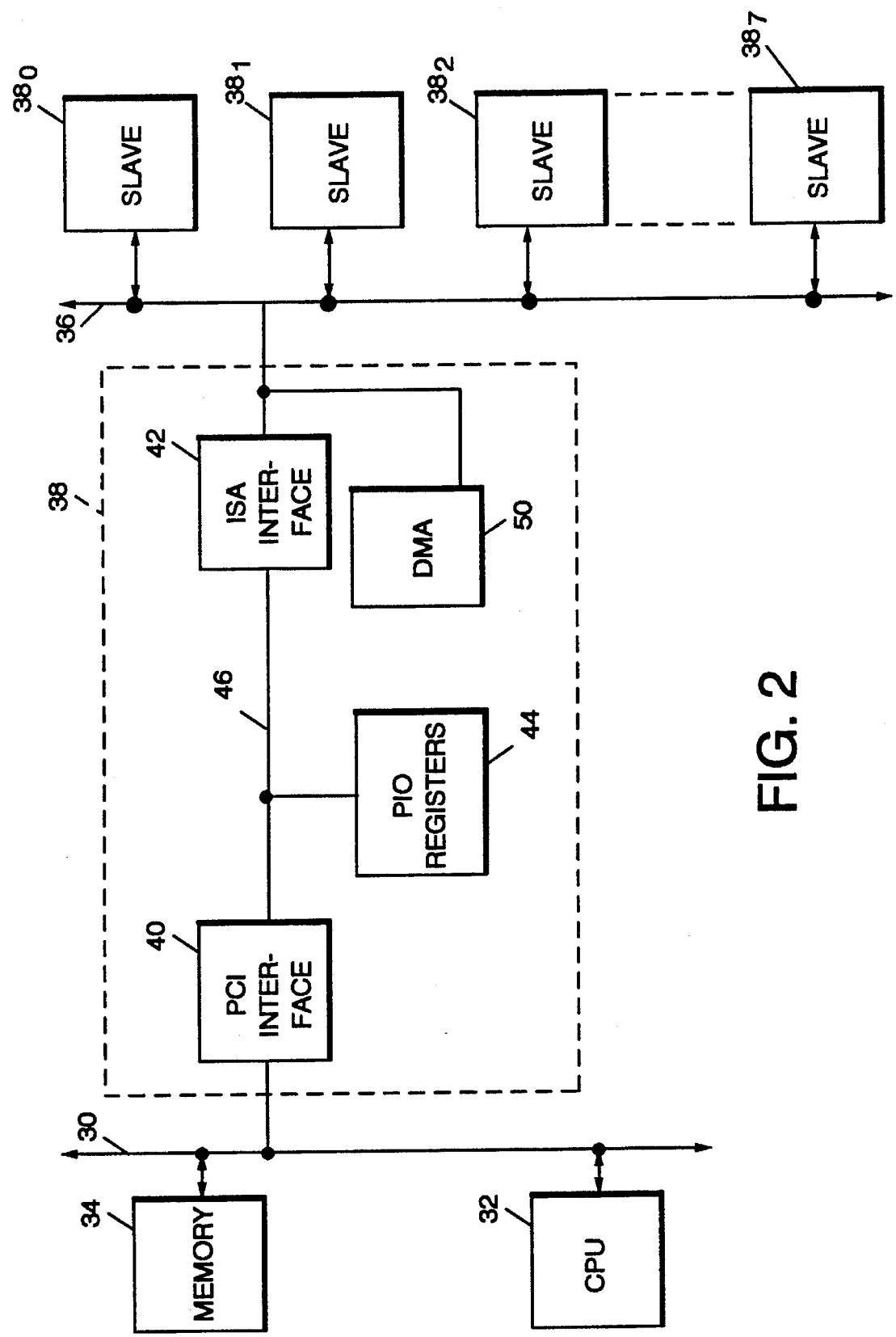
FIG. 2 is a block diagram of the computer system of FIG. 1.

FIG. 2 is a block diagram of an exemplary embodiment of the computer system of FIG. 1. The microprocessor 32 is coupled to a local bus 30, such as a peripheral controller interconnect (PCI) bus. Memory 34 is also coupled to the PCI bus 30.

The computer system also has a second bus serving as an expansion bus 36. This expansion bus can be, for example, an industry standard architecture (ISA) bus. Although the ISA bus 36 is much slower than the PCI bus 30, the ISA bus 36 is useful since many devices that can be coupled to the ISA bus 36 are not able to perform at a rate of speed commensurate with the speed of the PCI bus 30. The configuration of FIG. 2 therefore provides a first bus 30 which allows the use of high-speed devices, and a second bus 36 which allows the use of lower-speed devices.

A bridge chip 38 provides an interface between the PCI bus 30 and the ZSA bus 36. A PCI interface 40 within the bridge chip 38 translates PCI bus cycles of the PCI bus 30 into system bus cycles for a system bus 46 that couples the PCI interface 40 to an ISA interface 42. System bus cycles from the system bus 46 are converted to ISA bus cycles to the ISA bus 36 by the ISA interface 42. Programmable I/O registers 44 are coupled to the system bus 46. The bridge chip 38 also includes a DMA controller 50 which controls direct memory accesses in the system.

A plurality of ISA slave devices $38_0$–$38_7$ are coupled to the ISA bus 36. There is no $38_4$ slave device, since the fourth channel is a cascade channel, as will be discussed later. Each of these ISA slave devices $38_0$–$38_7$ can be either an 8-bit or a 16-bit device. Each of the individual ISA slave devices $38_0$–$38_7$ are assigned to a different DMA channel so that all memory accesses between the memory 34, for example, and the particular ISA slave will be carried out over the corresponding DMA channel. In the exemplary embodiment of FIG. 2, there are seven DMA channels provided by the DMA controller 50 for the seven ISA slaves $38_0$–$38_7$.

Figure 3:
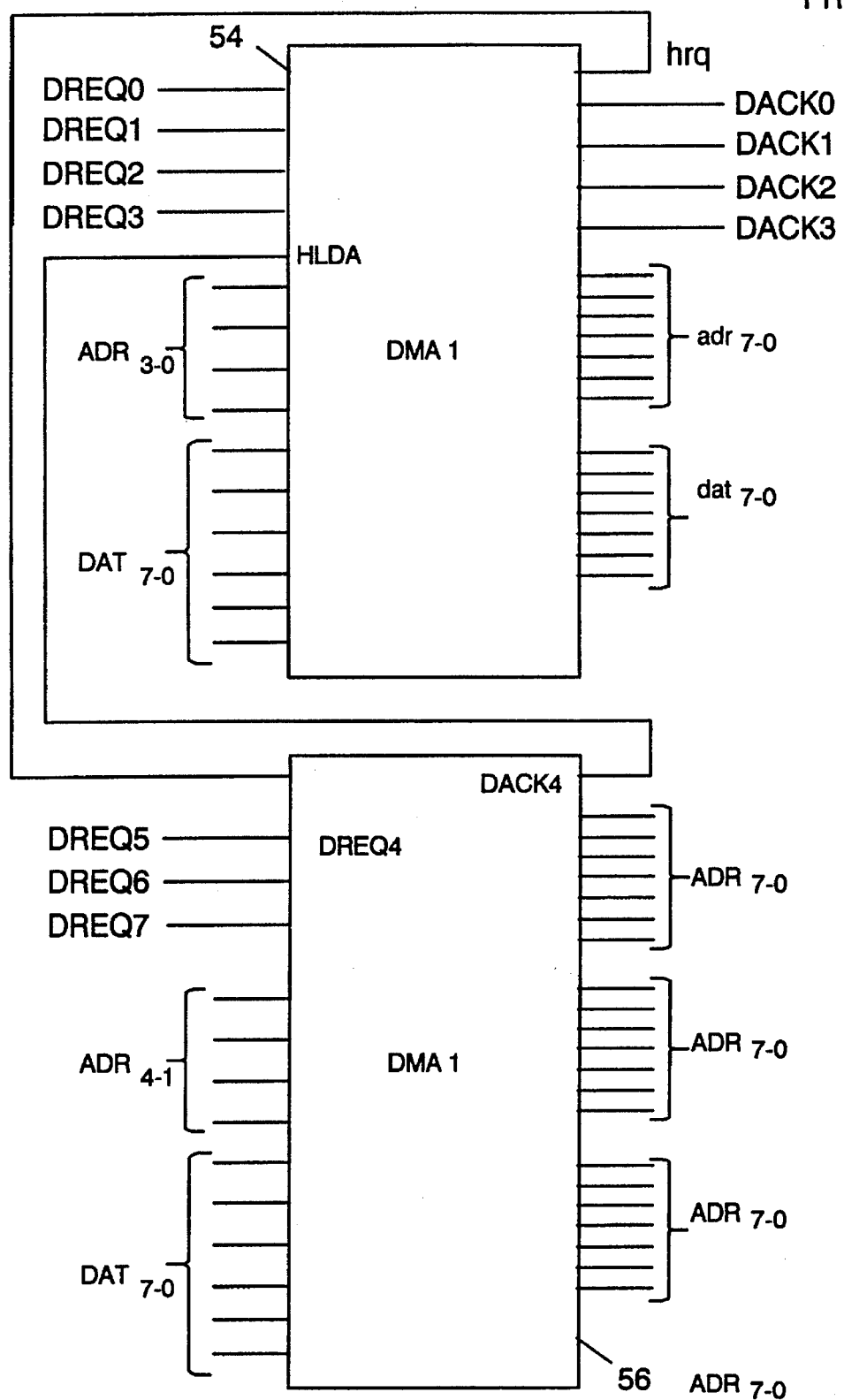
FIG. 3 is a block diagram of a cascaded DMA controller of the prior art.

FIG. 3 is a block diagram of a prior art cascaded controller. This cascaded DMA controller includes a pair of 8237 DMA controllers 54, 56. The first DMA controller 54 provides four 8-bit DMA channels, while the second DMA controller chip 56 provides three 16-bit DMA channels. Before explaining the hard-wiring configuration which limits the prior art DMA controllers to provide either an 8-bit channel or a 16-bit channel, a brief explanation of memory accesses will be provided with respect to FIG. 4.

Figure 4:
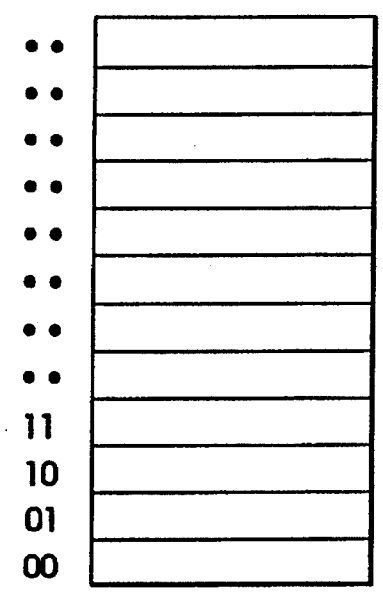
FIG. 4 is a block diagram showing a configuration of memory.

The block diagram of FIG. 4 depicts a plurality of memory locations, with only the bottom four memory locations being shown with addresses 00–11. A 16-bit access addresses the memory only at locations in which the least significant bit is a zero. For example, the 16-bit access will access memory locations 00 or 10. These are "even" accesses to memory. As described with respect to the prior art arrangement of FIG. 3, the connection of the address lines of the second DMA controller chip 56 to the address lines of the address bus cause a memory access which must be an even access. Therefore, only 16-bit accesses are provided on the DMA channels of the second DMA controller chip 56.

The ability to access "odd" memory locations, such as 01 and 11, allow an 8-bit access to memory. The first DMA controller 54 is connected to the address lines 0–3 of the address bus. This allows the first DMA controller 54 to generate odd addresses. By contrast, the second DMA controller 56 is coupled to address lines 1–4 of the address bus. The lowest significant bit of the address produced by the second DMA controller 56 would therefore be constrained to be a zero, making the address an even address. The connections of the first and second DMA controllers 54, 56 in the prior art arrangement determine whether even or an odd address could be generated from the respective DMA controllers 54, 56, and therefore whether the access would be an 8-bit access or a 16-bit access. The prior art arrangement places a limitation on the system designer as to the number of 8-bit ISA slaves that can be coupled to the system, as well as the number of 16-bit ISA slaves that can be coupled to the system.

Figure 5B:
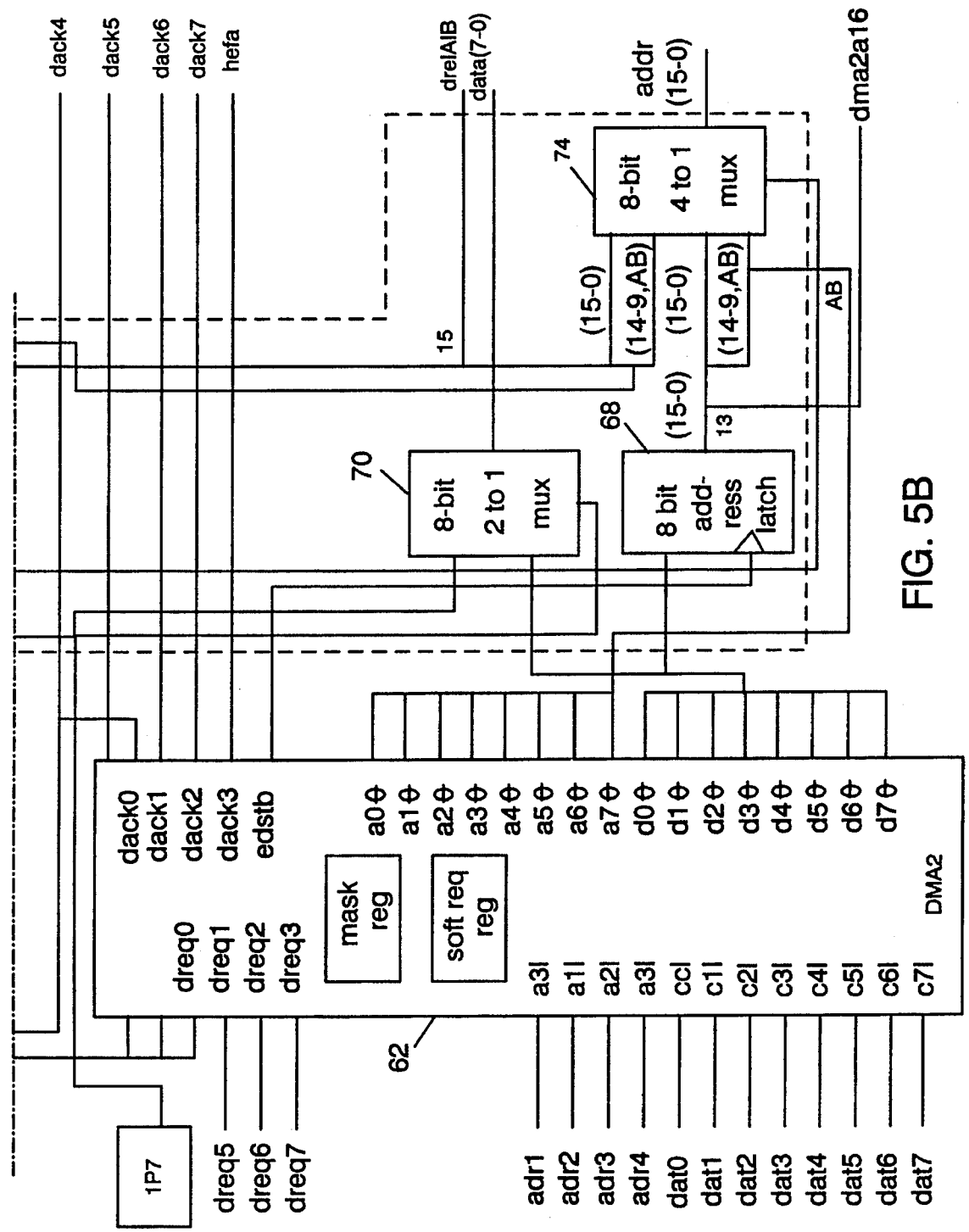
FIG. 5 is a block diagram of a DMA control circuit constructed in accordance with an embodiment of the present invention.

The present invention provides a dynamic configuration of the DMA channels to avoid the above limitations. FIG. 5 is a block diagram of an exemplary embodiment of a DMA controller circuit which provides dynamic configuration of the DMA channels. The DMA controller circuit includes a conventional pair of cascaded 8237 DMA controllers 60, 62 and a multiplexer circuit 64.

A number of different signals, such as the clock signal, etc., have not been shown in FIG. 5 so as not to obscure the invention. However, one of ordinary skill in the art would recognize that these conventional signals would be used in practice.

The first DMA controller 60 provides DMA channels 0–3 in response to request signals DREQ#0–DREQ#3. Addresses are programmed in the DMA controller 60 over lines ADR#0–ADR#3. Data is received over input lines DAT#0–DAT#7. Acknowledge signals are generated by the first DMA controller 60 as signals DACK#0–DACK#3.

The eight least significant bits of a 16-bit address are produced as output signals on pins A0–A7. The eight most significant bits of the 16-bit address are provided as outputs from D0–D7 when the address strobe signal ADSTB is enabled. When the address strobe is not enabled, the data signals are provided as the output from D0–D7. A hold request output (HRQ) from the first DMA controller 60 is coupled to the DREQ#0 input of the second DMA controller 62 and DACK#0 of the second DMA controller 62 is connected to the acknowledge HLDA of the first DMA controller 60 to provide the cascading of the pair of controllers 60, 62, as is well known in the art.

The second DMA controller 62 provides DMA channels 5–7 and receives DREQ#5–DREQ#7 at inputs DREQ#1–DREQ#3. The second DMA controller 62 provides at output pins DACK#1–DACK#3 the output signals DACK#5–DACK#7. The outputs of the address lines A0–A7 and data lines D0–D7 are the same as for the first DMA controller 60. Data lines D0–D7 receive as inputs DATA#0–DATA#7, the same as the first DMA controller 60. However, the second DMA controller 62 receives at inputs A0–A3 the signals ADR#1–ADR#4. This ensures that the first and second DMA controllers 60, 62 do not respond to the same I/O programming address.

The addresses generated by the first and second DMA controllers 60, 62 are received by the multiplexer circuit 64, shown in dashed lines. The multiplexer circuit 64 comprises two 8-bit address latches 66, 68, and 8-bit 2-to-1 multiplexer 70, and two 8-bit 4-to-1 multiplexers 72, 74.

The 8-bit 2-to-1 multiplexer 70 is a data multiplexer that receives the data signals D0–D7 from each of the first and second DMA controllers 60, 62. The data multiplexer 70 selects which set of data signals will be produced as output data (7–0) when reading the registers out of the first and second DMA controllers 60, 62.

When the data lines D0–D7 of the first and second DMA controllers 60, 62 are used as address lines for the most significant bits 15–8, these bits are latched in the respective 8-bit address latches 66, 68. The latches 66, 68 are under the control of the address strobe signal ADSTB from the first and second DMA controllers 60, 62.

The 8-bit 4-to-1 multiplexer 72 is a least significant bit multiplexer that produces as an output the least significant 8 bits of each address. The 8-bit 4-to-1 multiplexer 74 is a most significant bit multiplexer and produces the most significant bits 15–8 of each address.

The first multiplexer 72 has four inputs. At the first input are the least significant 8 bits of the address generated by the first DMA controller 60. At the second input, the first multiplexer 72 receives the least significant seven bits (6–0) of the least significant bits of the address generated by the first DMA controller 60. However, these bits are shifted to the left by one position and a zero is provided as the least significant bit of the 8-bits input into the multiplexer 72. The second input therefore represents the least significant bits of the memory address shifted by one position to the left, with a zero being placed into the least significant bit position. The third input of the first multiplexer 72 are the least significant 8 bits (7–0) of the unshifted memory address generated by the second DMA controller 62. The fourth input of the first multiplexer 72 receives a shifted memory address from the second DMA controller 62. This shifted memory address has been shifted in the same manner as the memory address received at the second input.

The second multiplexer 74 receives at its first input the most significant bits (15–8) of the address generated by the first DMA controller 60. These bits are provided by the 8-bit address latch 66. At its third input, the second multiplexer 74 receives the most significant bits (15–8) generated by addresses from the second DMA controller 62, through the 8-bit address latch 68. The second multiplexer 74 receives at its second and fourth inputs a shifted version of the most significant bits from the first and second DMA controllers 60, 62, respectively. In bit position 8, the output of address line A7 is provided. The upper seven bits in positions 15–8 are provided by bits (14–9) of the shifted memory address. Thus, the address bits provided at the second and fourth inputs correspond to bits (14–7) of the unshifted memory address, but shifted into positions 15–8. The second multiplexer 74 therefore receives the eight most significant bits of an unshifted memory address from each of the first and second DMA controllers 60, 62 and the eight most significant bits of a shifted memory address from each of the first and second DMA controllers 60, 62.

For certain purposes, it may be necessary to preserve the shifted bit 15 so that the information contained in this bit is not lost. This bit is provided at outputs (one for each DMA controller 60, 62) as address bit 16 (DMA1A16, DMA2A16).

The DMA control circuit includes a programmable register 76 which contains information for each DMA channel as to whether that channel is an 8-bit channel or a 16-bit channel. The acknowledge signals (DACK#0–DACK#3; DACK#5–DACK#7) for the seven DMA channels are provided as inputs to a 7-to-2 multiplexer that produces an output signal that indicates which DMA controller 60, or 62 carries the DMA channel that will be used for the transfer. Based upon the information in the register 76, simple encoding logic 79 produces a select signal that causes the multiplexers 72, 74 to provide the required output.

In preferred embodiments of the invention, upon system power-up, the register 76 defaults to the IBM PC/AT design of configuring DMA channels 0–3 as 8-bit channels and DMA channels 0–7 as 16-bit channels.

Two examples of operation will be described. Assume for the first example that DMA channel 5 is currently programmed in the DMA control circuit to be an 8-bit channel.

When a DMA control cycle is performed, only unshifted memory address should be produced as an output from the DMA control circuit. The signal from the register 76 corresponding to DMA channel 5 being an 8-bit channel causes the first multiplexer 72 to select the third input having the least significant bits (7–0) of the unshifted memory address in the second DMA controller 62 to be produced at the multiplexer output as address (7–0). The same control signal causes the second multiplexer 74 to select the most significant 8-bits of the unshifted memory address from the second DMA controller 62 to produce at the multiplexer output the address bits (15–8). Since these bits have not been shifted from the address generated by the second DMA controller 62, either odd or even accesses to memory are possible, thereby providing 8-bit memory accesses.

In the second example, the DMA channel 2 is programmed to be a 16-bit channel provided by the first DMA controller 60. The control signal from the register 76 causes the multiplexer 72 to select the second input which corresponds to the least significant bits of the shifted memory address and a zero in the least significant position. This is provided at the multiplexer output as address bits (7–0) of a memory access. The control signal also causes the second multiplexer 74 to select the most significant bits of the shafted memory address (second input) to be produced as the output address bits (15–8).

The above are examples only, as DMA channel 5 can be readily programmed to be a 16-bit channel, while DMA channel 2 can be programmed to be an 8-bit channel.

Figure 6:
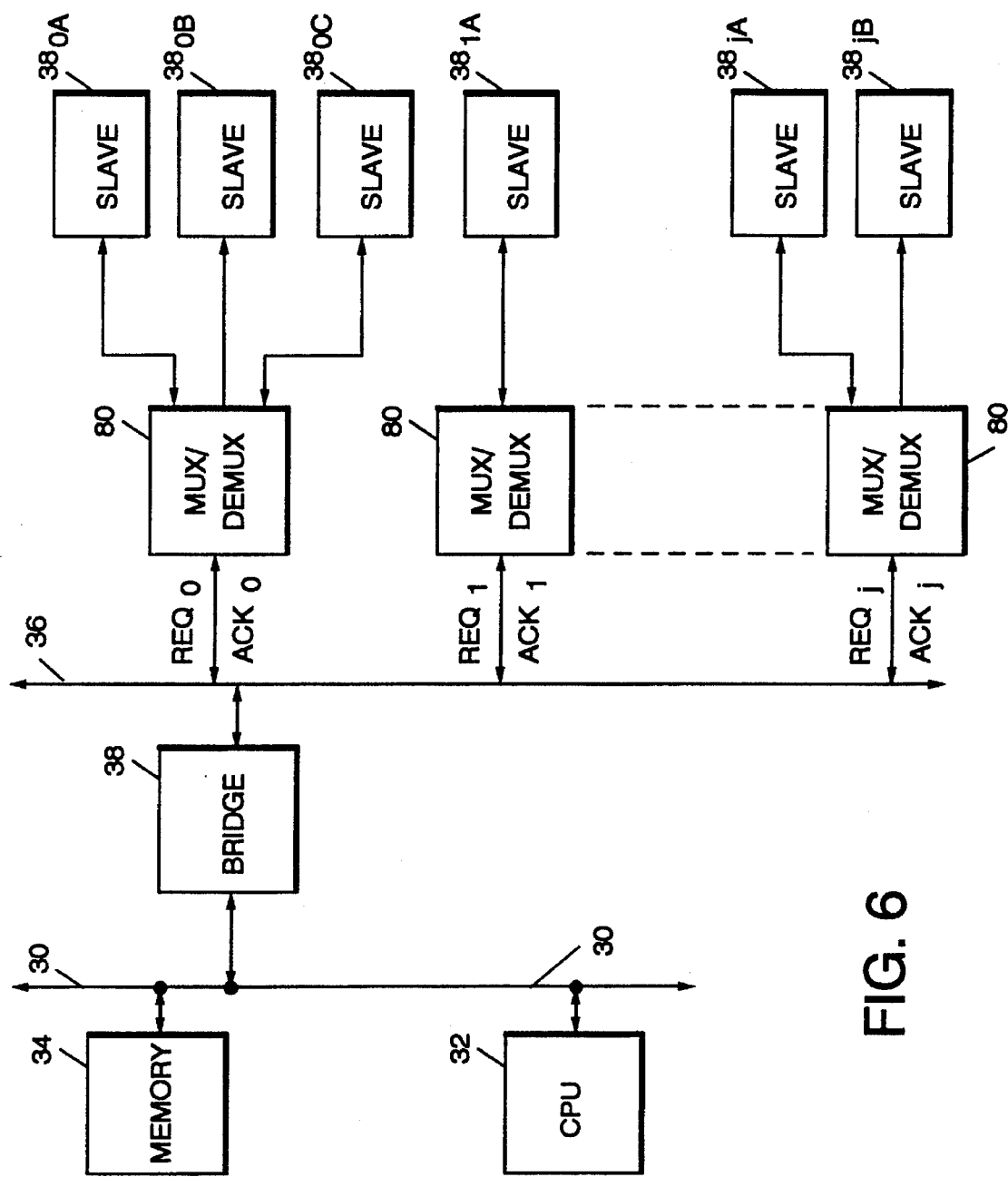
FIG. 6 is a block diagram of another embodiment of the present invention.

FIG. 6 is a block diagram of another embodiment of the present invention which allows more than seven slaves to be coupled to the system by the sharing of the seven DMA channels. The system includes multiplexer/demultiplexer units 80 coupled between the ISA bus 36 and the individual devices $38_0\text{–}38_J$. There are seven such units, although only three are illustrated in FIG. 6. Each multiplexer/demultiplexer unit 80 communicates with the DMA controller 50 in the bridge chip 38 over the bus 36 through the same acknowledge and request signals as the embodiment of FIG. 1. These signals, however, are multiplexed and demultiplexed by the units 80 to allow multiple slaves on each DMA channel.

FIG. 7 is a block diagram of the multiplexer and demultiplexer unit 80. A demultiplexer 82 receives the acknowledge signal DACK for a particular DMA channel, such as channel 0. Under the control of a select register 84, the multiplexer 82 provides separate acknowledge signals DACK#$0_A$–DACK#$0_C$ for the separate slaves $38_{0A}\text{–}38_{0C}$. Similarly the multiplexer 86 receives separate request signals REQ#$0_A$–REQ#$0_C$ from the DMA slaves $38_{0A}\text{–}38_{0C}$ that share the DMA channel 0 and multiplexes these signals to provide a single REQ#0 signal to the DMA controller 50. By this arrangement, multiple DMA slaves can share a single DMA channel to expand the total number of DMA slaves coupled to the system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bridge for interfacing buses in a computer system that has a plurality of buses, a processor and a memory, the bridge comprising:

a direct memory access (DMA) control circuit coupled to the processor and the memory, the DMA control circuit including a pair of cascaded DMA controllers that provide a plurality of DMA channels, wherein each of the DMA channels is dynamically configurable to carry either first size accesses to memory or second size accesses to memory; wherein a plurality of DMA slaves of the computer system respectively communicate with the DMA control circuit over the individual DMA channels, each DMA slave being either a first size compatible slave or a second size compatible slave; wherein the DMA control circuit includes a multiplexer circuit coupled to the cascaded DMA controllers, the multiplexer circuit receiving an unshifted memory address and a shifted memory address from the cascaded DMA controllers, and a select signal that causes the multiplexer circuit to selectively produce either the unshifted memory address or the shifted memory address, the unshifted memory address being the first size access to memory and the shifted memory address being the second size access to memory; and wherein the first size accesses to memory are 8-bit accesses and the second size accesses are 16-bit accesses, the first size compatible slave is an 8-bit slave and the second size compatible slave is a 16-bit slave; and wherein the multiplexer circuit includes: a first 8-bit 4-to-1 multiplexer that receives the least significant 8 bits of the unshifted memory address from each of the DMA controllers, and the least significant 8 bits of the shifted memory address from each of the DMA controllers; and a second 8-bit 4-to-1 multiplexer that receives the most significant 8 bits of the unshifted memory address from each of the DMA controllers, and the most significant 8 bits of the shifted memory address from each of the DMA controllers.

2. The bridge of claim 1, wherein the least significant 8 bits of each shifted memory address include a zero in the least significant bit of the least significant 8 bits, and the 7 least significant bits of the unshifted memory address shifted by one position to form the 7 most significant bits of the least significant 8 bits of each shifted memory address.

3. The bridge of claim 2, wherein the most significant 8 bits of each shifted memory address include the most significant bit of the least significant 8 bits of each shifted memory address that forms the least significant bit of the most significant 8 bits of the shifted memory address, and the 7 least significant bits of the most significant 8 bits of the unshifted memory address shifted by one position to form the 7 most significant bits of the most significant 8 bits of each shifted memory address.

4. The bridge of claim 3, further comprising a register having a stored select signal for each DMA channel, the register providing said stored select signal to the multiplexer circuit when the specific DMA channel is accessed.

5. The bridge of claim 4, wherein the select signal for each DMA channel indicates whether the DMA channel is configured to carry first size accesses to memory or second size accesses to memory.

6. A direct memory access (DMA) control circuit comprising:

a pair of cascaded DMA controllers that provide a plurality of DMA channels, wherein each of the DMA channels are dynamically configurable to carry either first size accesses to memory or second size accesses to a memory; and a multiplexer circuit coupled to the cascaded DMA controllers, the multiplexer circuit receiving an unshifted memory address and a shifted memory address from the cascaded DMA controllers, and a select signal that causes the multiplexer circuit to selectively produce either the unshifted memory address or the shifted memory address, the unshifted memory address being the first size access to a memory and the shifted memory address being the second size access to a memory; and wherein the first size accesses to a memory are 8-bit accesses and the second size accesses are 16-bit accesses; and wherein the multiplexer circuit includes: a first 8-bit 4-to-1 multiplexer that receives the least significant 8 bits of the unshifted memory address from each of the DMA controllers, and the least significant 8 bits of the shifted memory address from each of the DMA controllers; and a second 8-bit 4-to-1 multiplexer that receives the most significant 8 bits of the unshifted memory address from each of the DMA controllers, and the most significant 8 bits of the shifted memory address from each of the DMA controllers.

7. The circuit of claim 6, wherein the least significant 8 bits of each shifted memory address include a zero in the least significant bit of the least significant 8 bits, and the 7 least significant bits of the unshifted memory address shifted by one position to the left to form the 7 most significant bits of the least significant 8 bits of each shifted memory address.

8. The circuit of claim 7, wherein the most significant 8 bits of each shifted memory address include the most significant bit of the least significant 8 bits of each shifted memory address that forms the least significant bit of the most significant 8 bits of the shifted memory address, and the 7 least significant bits of the most significant 8 bits of the unshifted memory address shifted by one position to form the 7 most significant bits of the most significant 8 bits of each shifted memory address.

9. The circuit of claim 8, further comprising a register having a stored select signal for each DMA channel, the register providing said stored select signal to the multiplexer circuit when the specific DMA channel is accessed.

10. The circuit of claim 9, wherein the select signal for each DMA channel indicates whether the DMA channel is configured to carry first size accesses to memory or second size accesses to a memory.

* * * * *